(12) United States Patent
Jain (10) Patent No.: US 11,843,253 B2
(45) Date of Patent: Dec. 12, 2023

(54) CONTROLLED ENERGY SYSTEM

(71) Applicant: Navia Energy Inc., San Jose, CA (US)

(72) Inventor: Babu Jain, San Jose, CA (US)

(73) Assignee: Navia Energy Inc., San Jose, CA (US)

( * ) Notice: Subject to any disclaimer, the term of this patent is extended or adjusted under 35 U.S.C. 154(b) by 0 days.

(21) Appl. No.: 17/494,638

(22) Filed: Oct. 5, 2021

(65) Prior Publication Data

US 2022/0109305 A1    Apr. 7, 2022

Related U.S. Application Data

(60) Provisional application No. 63/088,264, filed on Oct. 6, 2020.

(51) Int. Cl.
*H02J 3/40*    (2006.01)
*H02J 3/38*    (2006.01)

(52) U.S. Cl.
CPC ............ *H02J 3/40* (2013.01); *H02J 3/381* (2013.01)

(58) Field of Classification Search
CPC .................................. H02J 3/40; H02J 3/381
USPC .................................................... 307/31
See application file for complete search history.

(56) References Cited

U.S. PATENT DOCUMENTS

| | | | | |
|---|---|---|---|---|
| 7,738,267 B1* | 6/2010 | Tallam | ............... | H02M 7/5387 363/35 |
| 8,624,561 B1* | 1/2014 | Slavin | ................ | H02J 3/383 320/135 |
| 2011/0006603 A1 | 1/2011 | Robinson | | |
| 2011/0254372 A1 | 10/2011 | Haines | | |
| 2013/0124882 A1 | 12/2013 | Clarke | | |
| 2015/0380968 A1* | 12/2015 | Lee | ............ | G06F 1/30 713/300 |
| 2017/0149248 A1 | 5/2017 | Della Sera | | |
| 2017/0331293 A1* | 11/2017 | Narla | ................ | H02J 3/383 |
| 2018/0226797 A1* | 8/2018 | Galin | ................ | H02J 3/14 |
| 2018/0366978 A1 | 12/2018 | Matan | | |

FOREIGN PATENT DOCUMENTS

WO    WO-2009/140551 A3    11/2009

OTHER PUBLICATIONS

International Search Report and The Written Opinion of The International Searching Authority dated Dec. 16, 2021, for related PCT Application No. PCT/US21/53787 filed Oct. 6, 2021, 7 pages.

* cited by examiner

*Primary Examiner* — Richard Tan (74) *Attorney, Agent, or Firm* — MAHAMEDI IP LAW LLP (57) ABSTRACT

An energy system substantially converts the power input into an AC power signal that is substantially synchronized with a power signal of the power grid. The energy system is further operable in alternative modes, including in an on-grid mode and off-grid mode. In the on-grid mode, the energy system provides the synchronized AC power signal to the power grid. In the off-grid mode, the energy delivers at least a portion of the AC power signal to a grid load.

12 Claims, 5 Drawing Sheets

CONTROLLED ENERGY SYSTEM

RELATED APPLICATIONS

This application claims benefit of priority to Provisional U.S. Application No. 63/088,264, filed on Oct. 6, 2020. Additionally, this application hereby incorporates by reference, in their respective entireties, Provisional U.S. Application No. 63/061,796, filed on Aug. 6, 2020, and Provisional U.S. Application No. 63/088,264, filed on Oct. 6, 2020.

BACKGROUND

Renewable energy sources typically convert light/wind energy into electrical energy. Solar systems, for example, utilize one or more solar panels that are connected in series or parallel or both (in all possible combinations) to generate a DC power signal as output. Energy systems exist to receive the DC power signal from a renewable energy resource. Such systems utilize inverters, commonly known as grid tied inverter ("GTI") or grid exporting inverter. Typical solar energy generation equipment installed today are of GTI type. This equipment can feed power to the grid, and utilities treat this an input of energy. Such conventional approaches generally stop producing power if there is a power grid failure, as the inverters used by such approaches using the power grid voltage and frequency as a reference signal for supplying available power to the grid. Even in systems that utilize batteries, there is typically a duration of downtime between when the power grid fails and the battery component comes online.

DETAILED DESCRIPTION

In examples, an energy system is operable to receive a power input from a power generation system. The energy system substantially converts the power input into an AC power signal that is substantially synchronized with a power signal of the power grid. The energy system is further operable in alternative modes, including in an on-grid mode and off-grid mode. In the on-grid mode, the energy system provides the synchronized AC power signal to the power grid. In the off-grid mode, the energy delivers at least a portion of the AC power signal to a grid load.

As used herein, the term "synchronize" and variants thereof, in context provided, means at least one power signal is modified to have at least a phase and frequency that matches that of the other power signal. The term "substantially" means at least 90% of a defined quantity. Thus, a synchronized power signal will have a phase and frequency that is within at least 90% of the reference power signal.

As used herein, the term "minimize", "maximize" and "optimize" means implementing programmatic operations intelligently, to further an objective with respect to the functionality described.

Figure 1:
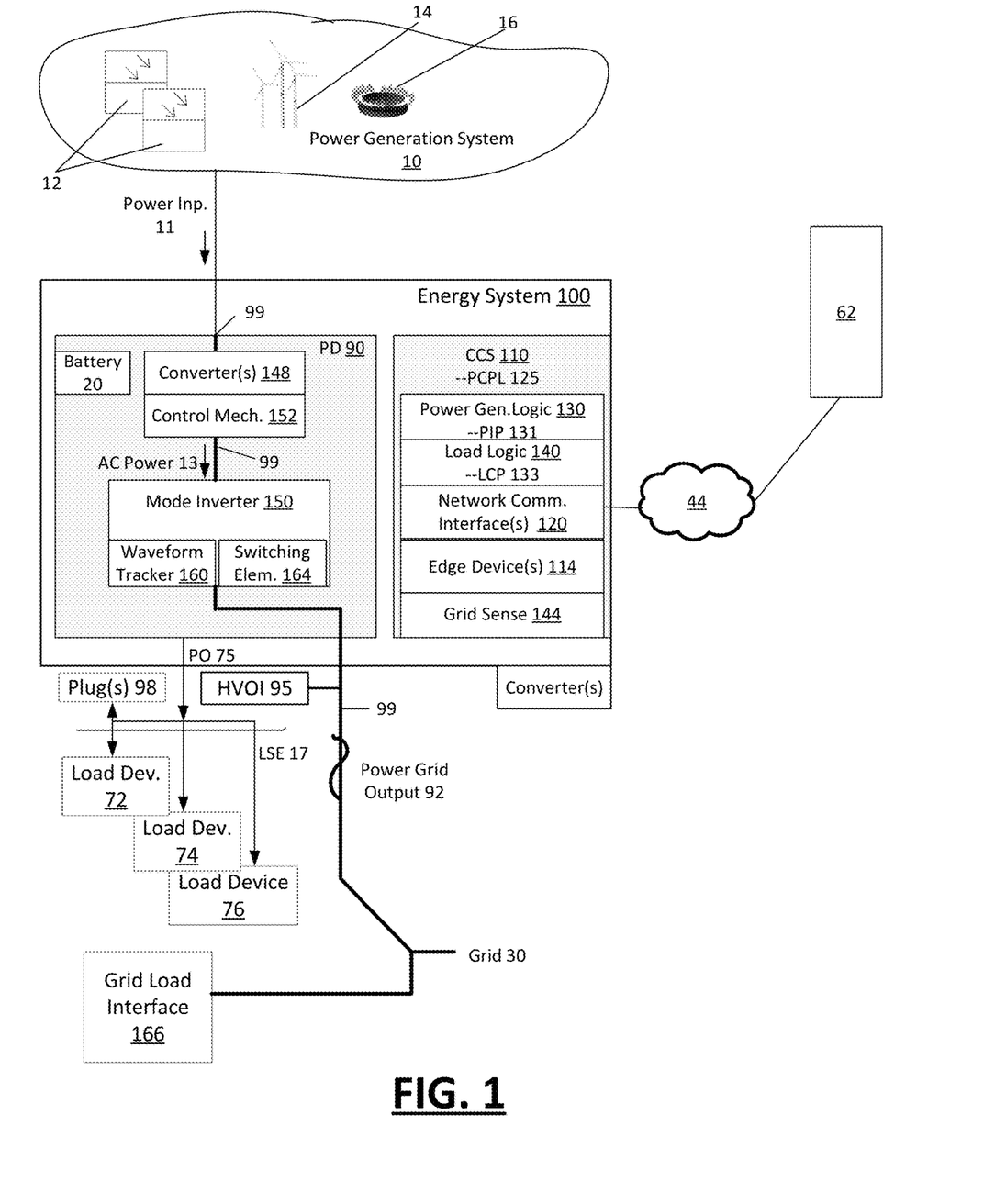
FIG. 1 illustrates an example energy system, according to one or more embodiments.

FIG. 1 illustrates an example energy system, according to one or more embodiments. Examples provide for an energy system 100 that uses software or other logic to power a set of load devices 72, 74, 76 in customized or use-specific configurations, using power provided through an energy system 10. As described with examples, the energy system 100 includes a power distribution subsystem 90 and a control computing subsystem 110. In some examples, the energy system 100 is implemented as a unit or apparatus, where the power distribution subsystem 90 and the control computing subsystem 110 share a housing and other resources, such as internal data or power bus lines.

In variations, the energy system 100 is implemented as a distributed system, where, for example, the control computing subsystem 110 and power distribution subsystem 90 are implemented as separate devices that are connected by a data channel. For example, the control computing subsystem 110 can be implemented by a desktop or workstation, which in turn communicates with the power distribution subsystem 90.

Power Generation System

The power generation system 10 can include one or more types of energy generation resources. In examples, the power generation system 10 includes renewable energy sources, such as provided by solar cells 12, wind turbines 14, and/or geothermal energy sources 16. In variations, the power generation system 10 can include fuel (e.g., diesel) driven generators. In examples, the power generation system 10 is configured to power a dwelling or commercial building. Still further, in some implementations, the power generation system 10 may be sized and distributed to generate a high voltage power output.

Control Computing Subsystem

The control computing subsystem 110 can include one or more network communication interfaces 120. In some variations, the control computing subsystem 110 further includes power generation logic 130 and load logic 140. Still further, in some variations, the control computing subsystem 110 can also include a grid sensing elements 144. Additionally, in some examples, the control computing subsystem 110 can include or integrate one or more edge compute devices 114.

Figure 5:
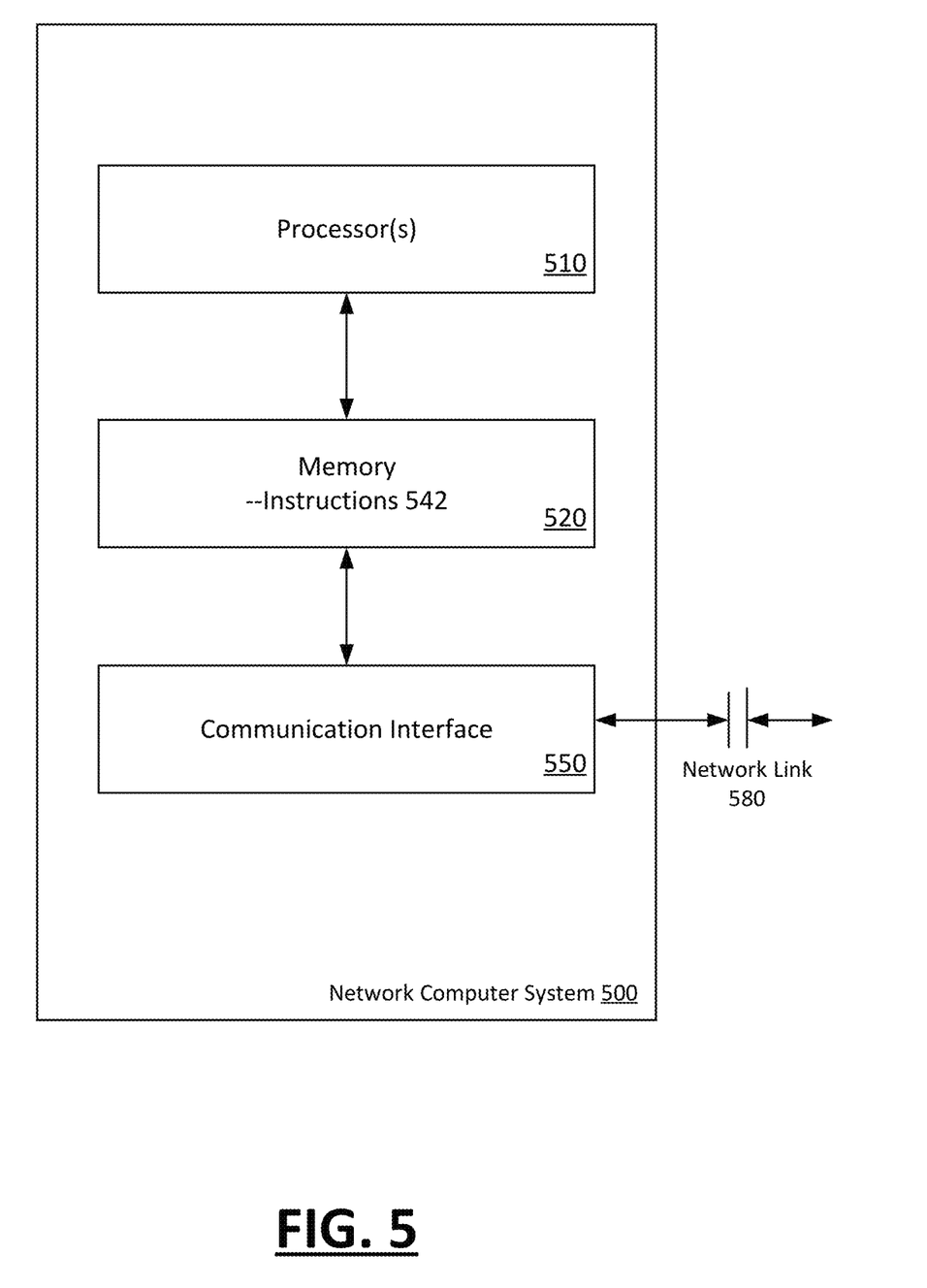
FIG. 5 illustrates a computer system on which one or more embodiments can be implemented.

The control computing subsystem 110 can be implemented by a computer system such as described with an example of FIG. 5. In some examples, the control computing subsystem 110 and the power distribution subsystem 90 are integrated as one apparatus or device (shown as energy system 100), so as to share a common housing and/or internal circuitry, data or power bridges and/or other resources. In variations, the control computing subsystem 110 can be distributed across multiple discrete devices, such as on a computer that is separate from the power distribution subsystem 90.

The network communication interfaces 120 operate to send or receive communications over one or more networks (e.g., local area network (LAN), wide area network (WAN), the Internet) using communication protocols known for wired (including power line communications) and/or wireless networks, such as RS 485, RS 232, CAN bus, X-10 (wired communication category) WiFi (or 802.11 type protocol), Bluetooth, Zigbee (short range wireless category) and cellular (e.g., 3G, 4G, 5G), satellite and microwave communications (long range category). As described in examples, the control computing subsystem 110 can utilize the network communication interface(s) 120 to access one or more servers 60, 62 over one or more networks 44, in order to retrieve and install files corresponding to a power control profile logic (PCPL) 125. The control computing subsystem 110 can utilize the network communication interface(s) 120 to retrieve, for example, updates to an existing PCPL 125, or new PCPL 125 for a newly connected load device or newly desired purpose of use application.

Still further, in some variations, the control computing subsystem 110 also includes one or more edge compute device 114. Alternatively, the edge compute device 114 can be implemented as a separate device from the control computing subsystem 110. The edge compute device 114 can secure the control computing subsystem 110, load devices 72, 74 and 76, and/or other components of the energy system 100 from external threats and misuse. Additionally, as described with some examples, the edge compute device 114 can implement a communication subnetwork for the load devices 72, 74, 76 and other components of the energy system 100. As an addition or variation, the edge compute device 114 can implement a communication relay between components of the energy system 100 (including the load devices 72, 74, 76) and/or an external resource (e.g., application server 62).

As an addition or variation, the edge computing device(s) 114 is operable to communicate with external systems, such as a utility company, to receive (and send) information (e.g., information about the status of a power grid), notifications and alerts (e.g., power grid in danger of blackout), and commands. The edge computing devices 114 can receive commands to, for example, cause the edge computing devices 114 to directly or indirectly reduce power consumption from the energy system 100, such as through control of one or more load devices 72, 74, 76.

Still further, in some variations, one or more of the edge computing device(s) 114 that are used by a given energy system 100 can be implemented as virtual machines or programs that operate in a cloud computing environment. Still further, one or more edge computing devices 114 of a given energy system can operate in a cloud computing environment in the event physical edge computing devices are not present.

In some examples, the control computing subsystem 110 implements power management operations to control a power output 75 of power supply to the load devices 72, 74, 76, so that the load devices 72, 74, 76 are operated in accordance with a desired purpose or use application. As described with examples, the control computing subsystem 110 can implement power management operations by communicating operational commands to the power distribution subsystem 90 and/or individual load devices 72, 74, 76, using a corresponding power consumption logic PCPL 125 that is specific to a purpose, usage application, device or device type. As an addition or variation, individual load devices can implement PCPL 125 provided from the control computing subsystem 110 in order to distribute the logic underlying the power management operations to the individual load devices.

Power Consumption Profile Logic (PCPL)

In examples, each PCPL 125 includes one or more files that are executable by control computing subsystem 110 to control the operation of the load devices 72, 74, 76 in connection with a desired purpose or use case. In some examples, the commands are communicated to the power distribution subsystem 90 to control the power output 75 provided to the respective load devices, to cause the one or more of the respective load device 72, 74, 76 to operate in accordance with a desired purpose or use application. In some variations, the commands are communicated directly to one or more load devices 72, 74, 76 that have a wireless or wireline connection with the control computing subsystem 110. In examples, the control computing subsystem 110 implements one or more PCPL 125 that are specific to a particular load device 72, 74, 76, based at least in part on an identifier, type or characteristic of the respective load device. In variations, individual load devices 72, 74, 76 can be utilized with multiple PCPL 125. For example, a given load device 72 can be utilized with multiple PCPL 125, where, for example, the given load device 72 utilizes each of the multiple PCPL 125 for a corresponding purpose of use application. Still further, in other variations, the control computing subsystem 110 can utilize one of the PCPLs 125 for a subset of the load devices, based on the purpose of use application of those load devices. Further, the control computing subsystem 110 can utilize a corresponding PCPL 125 to implement a purpose or use application that utilize some or all of the connected load devices.

In examples, one or more PCPLs 125 can be implemented by the control computing subsystem 110 and/or load devices 72, 74, 76 for purposes that include (i) energy preservation, such as to extend the duration of available power stored with the battery component 20, (ii) optimizing energy use by load devices 72, 74, 76, (iii) forecasting available power, such as stored with the battery component 20 (which may be based on an output of the power generation system 10), (iv) forecasting power usage by the load devices 72, 74, 76, and/or (v) implementing policies for predefined conditions, such as off-grid or emergency conditions. In some variations, the control computing subsystem 110 performs forecasting, and selects or configures the PCPL 125 for individual devices based on the forecast determinations. The forecasting can be based on, for example, historical power usage over relevant time periods (e.g., most recent time interval, most recent seasonal interval, etc.).

Additionally, in some implementations, the PCPL 125 for a given device can include logic to enable functioning of the device in a particular manner and/or with the control computing subsystem 110. For example, the PCPL 125 of a security camera can include a software driver that enables the load device to communicate with the control computing subsystem 110 while receiving power from the power distribution subsystem 90 or the main of the house. Further, the driver component of the PCPL 125 can enable functionality, such as setting the operational mode of the device in response to certain conditions. For example, the driver component of the PCPL 125 can be implemented to operate in a low power setting (e.g., device turns on when motion sensor detects event) when the available power for the load devices 72, 74, 76 is depleted (e.g., such as when the grid is off and the battery component 20 is depleted). Accordingly, the PCPL 125 can determine the power output 75 which a corresponding load device 72, 74, 76 receives from the power distribution 90.

On a device level, the control computing subsystem 110 can implement one or more PCPLs 125 to control facets of the operation of a load device 72, 74, 76, such as, for example, a duration in which the device is powered, a power level of the load device, an operational setting of the load device, trigger conditions that change the operational setting of the load device, and/or a mode of operation for the load device. Accordingly, the control computing subsystem 110 can implement PCPLs 125 to control the power output 75 to the corresponding load devices 72, 74, 76 and/or control consumption of power supplied by the power distribution subsystem to the individual load devices 72, 74, 76.

Further, individual PCPL 125 can be specific to a particular use application. For example, a set of load devices 72, 74, 76 can be controlled in a residential setting using a first PCPL 125, while the same set of load devices 72, 74, 76 can be controlled in a commercial setting using a second PCPL 125. In such an example, the difference between implementing the first and second PCPL 125 can correspond to a difference in a duration, power level, operational setting, operational mode and/or triggering conditions (e.g., for changing power level, mode of operation, etc.) of the respective devices when powered by the power distribution subsystem 90.

Artificial Intelligence Agent

Still further, in some examples, the PCPL 125 can include machine-learned models (or artificial intelligence ("AI")). The control computing subsystem 110 can implement such types of PCPL 125 when, for example, the operation of the load devices 72, 74, 76 are to be dynamically determined in response to an external condition. For example, the control computing subsystem 110 can implement an AI aspect to address how individual load devices 72, 74, 76 should operate when a forest fire is in proximity to the location of the system. In such an example, the power level or duration of certain load devices can be adjusted based on, for example, the predicted proximity of the fire. As the fire nears, remaining power from the battery component 20 can be distributed exclusively to enabling operations of emergency lights and sprinklers, while load devices which may be fire hazards are shut down.

According to examples, the control computing subsystem 110 includes an agent program or component that can detect the presence of an external condition, and retrieve and execute a corresponding PCPL 125 that is specific for the detected condition. For example, the control computing subsystem 110 may employ an agent that can interface with sensors (e.g., air quality sensors) or public network sites to detect proximity or probability of a wildfire. If a wildfire is detected, the agent can identify and execute an appropriate PCPL 125 from an available library (e.g., via the application server 62).

In examples, each PCPL 125 can correspond to a file, or set of files, which are downloaded from an application server 62 or other remote source. While some examples provide for the control computing subsystem 110 to implement the PCPL 125 for device(s) connected to the power distribution subsystem 90, in variations, the operation of the control computing subsystem 110 may be distributed. For example, in some variations, the control computing subsystem 110 can communicate the PCPL 125 (or portions thereof) to a smart load device, which in turn implements the PCPL 125. Alternatively, the control computing subsystem 110 can be implemented in part or in whole with edge computing device 114, which can supply, for example, configurations to the load devices 72, 74, 76 based in part on a particular PCPL 125.

Load Device Operation

In other variations, one or more of the load devices 72, 74, 76 can retrieve or obtain PCPL 125 from the application server 62. In one such implementation, one or more load devices 72, 74, 76 include, for example, a network interface to communicate directly with the application server 62 to obtain a corresponding PCPL 125. In another of such implementation, one or more load devices 72, 74, 76 communicate, via a local communication link (e.g., Wi-Fi, wireline, X-10, etc.), with the edge compute device 114 to retrieve the corresponding PCPL 125.

According to some examples, the load devices 72, 74, 76 can correspond to devices of different types which are capable of being powered through an output of the power generation system 10. Additionally, in some variations, load devices 72, 74, 76 can include integrated communication capabilities to communicate wirelessly, or through wireline (e.g., via power line, using X-10 communication protocol) with the power distribution subsystem 90, via the edge compute device 114. To illustrate, in such examples, one or more of the load devices 72, 74, 76 can correspond to (i) a smart wall outlet plug or power receptacle, and (ii) an appliance, each of the devices being powered through a main of a dwelling, using wireless or powerline communications to communicate with the edge compute device 114. Still further, as described with some examples, the load devices 72, 74, 76 can include an electric vehicle.

Load and Power Generation Logic

In some examples, the control computing subsystem 110 includes power generation logic 130 which communicates with power generation sensor(s) 15 to determine a power input profile (PIP)131 for the power distribution subsystem 90. The power generation sensor(s) 15 can, for example, be integrated with circuitry, hardware or components of the energy sources of the power generation system 10. The power generation logic 130 can, for example, be implemented as hardware, firmware or software that is permanently integrated with or permanently installed on the control computing subsystem 110. As an addition or variation, the power generation sensor(s) 15 can monitor the power input 11 from the power generation system 10. For example, the power generation sensor 15 can be integrated with circuitry or elements of the power distribution subsystem 90 to detect the power signal 11 provided by power generation system 10. The control computing subsystem 110 can, for example, communicate with the power generation sensor(s) 15 wirelessly, using wired lines, or through the power distribution subsystem 90.

In some examples, the control computing subsystem 110 includes load logic which communicates with one or more load sensing elements 17 of one or more respective load devices 72, 74, 76. The load logic can, for example, be implemented as hardware, firmware or software that is permanently integrated with or permanently installed on the control computing subsystem 110. Alternatively, the load logic can be temporarily installed with a downloaded PCPL 125, or the PCPL 125 can be installed as an update to exiting load logic. The load sensing elements 17 can, for example, be integrated with circuitry, hardware or components of the power distribution subsystem 90 and/or individual load devices 72, 74, 76. The control computing subsystem 110 can, for example, communicate with the load sensing elements 17 wirelessly, using wired lines, or through the power distribution subsystem 90. The control computing subsystem 110 can communicate with the load sensing elements 17 to determine one or more load consumption profiles (LCP) 133 for the power distribution subsystem 90.

The control computing subsystem 110 can utilize the PCP 131 and the LCP 133 to implement control operations that optimize, for example, the power usage of the respective load devices 72, 74, 76. The optimization can be to advance the objective of, for example, powering load devices 72, 74, 76 while (i) minimizing the amount of power stored with the battery component 20, (ii) maximizing the efficiency of the load device 72, 74, 76, (iii) minimizing a cost of operating load devices 72, 74, 76 for a particular purpose or use application. In examples, the control computing subsystem 110 can utilize machine-learning algorithms (or artificial intelligence) when implementing optimization considerations to store power from the power generation system 10 and/or power the load devices 72, 74, 76. Further, each of the load devices 72, 74, 76 can implement corresponding PCPLs 125 to advance the objectives, while providing a desired utilitarian function.

Power Distribution Subsystem

Depending on implementation, the power distribution subsystem 90 includes one or more of a solar energy power converter, a wind energy power converter, a fuel energy cell (e.g., hydrogen power cell), or other type of current filter and DC to AC converter (collectively "DC-AC component(s)"). The power distribution subsystem 90 can also include battery circuitry and logic (e.g., charge controllers) that couples the power distribution subsystem 90 to a battery. The power distribution subsystem 90 can use the battery circuitry to store power derived from the output of the power generation system 10 (e.g., via a DC input) with one or more battery cells of the battery component 20. In examples, the power distribution subsystem 90 can also include a utility grid power or other DC to AC converter. Still further, the power distribution subsystem 90 can also include a power optimizer (such as module level power electronic ("MLPE") for driving one or more load devices 72, 74, 76 directly from the DC power signal 11 generated by the power generation system 10.

In examples, the power distribution subsystem 90 connects to the load devices 72, 74, 76 using a data/power port, such as a Universal Serial Bus (USB) or other serial bus connector. By way of example, the load devices 72, 74, 76 can include a monitor, a human interface device (e.g., pointer), a security camera, weather sensor, fire detector, intrusion detector, streetlight, traffic light, cellular transceiver, cellular telecommunication tower, V2X transceivers, gaming device, and power/device relay device.

As described with examples below, at least some embodiments provide for the power distribution subsystem 90 can operate in multiple modes, including (i) on-grid mode, where an output of the power distribution subsystem 90 is directed to the power grid 30, and (ii) off-grid mode, where an output of the power distribution subsystem 90 is directed to connected load device(s) 72, 74, 76.

According to some embodiments, power distribution subsystem 90 is operable to receive power signal 11 from the power generation system 10, and to supply power to (i) a battery component 20, (ii) the load devices 72, 74, 76 (either directly or indirectly via the battery component 20), (iii) the power grid 30, and/or (iv) a gid load, where the grid load includes one or more grid load interfaces 166 (e.g., device, powerline or junction where grid power is being received at a dwelling of the energy system 100) and/or devices that operate off of a main or grid line.

The battery component 20 can correspond to, for example, one or more battery modules, or a device (e.g., electric car) with an onboard rechargeable battery. The power distribution system 100 can be configured to supply and draw power to the battery component according to according to predetermined schedules and/or events. For example, the power distribution system 90 can be configured to charge the battery component 20 during day time, when the power signal 11 from the power generation system 10 is high. Likewise, the power distribution system 90 can be configured to draw power on a schedule (e.g., evenings), or in response to events (e.g., high power usage interval or grid failure event).

Voltage/on-Grid Mode Inverter

According to examples, the power distribution subsystem 90 includes a mode inverter 150 that is triggerable by a detected condition (e.g., grid failure) to switch the operational mode of the power distribution subsystem 90. The power distribution subsystem 90 can operate in an on-grid mode where the power distribution subsystem 90 generates a power output that is supplied to a connected grid via a grid interface. Thus, in the on-grid mode, power generation from the power generation system 10 can supply power to the connected power grid 30. The power distribution subsystem 90 is also operable in an off-grid mode, where the power output of the power distribution subsystem 90 is directed to, for example, battery component 20, grid load devices 166, and/or load devices 72, 74, 76.

According to some examples, the mode inverter 150 is triggerable by grid failure. Prior to the triggerable condition, the power distribution subsystem 90 operates in the on-grid mode to receive direct power from the power generation system 10, to utilize converters/regulators and switches (represented by converter 148) to convert the direct current (DC) power input 11, received directly or indirectly, from the power generation system 10 to an alternating current (AC) power signal 13. In some implementations, DC power signal 11 can be supplied to battery component 20 and/or load devices that utilize DC power, and the AC power signal 13 is supplied to load devices which utilize AC power. In variations, the AC power signal 13 is supplied to the battery component 20 and other devices that utilize DC power. For example, additional converters can be used to convert the AC power signal 13 to DC power for the battery component or other load devices.

In examples, the power distribution subsystem 90 includes switches and other controllers (represented by control mechanism 152) to control the distribution of power by the power distribution subsystem 90 when operating on the on-grid mode. The power distribution subsystem 90 can either include logic, or operate under control of the control computing subsystem 110, to distribute power received from the power generation system 10 in accordance with one or more policies to optimize use of power in accordance with one or more objectives. For example, the objectives of the power distribution subsystem 90 can be based on an objective to (i) minimize the use of grid power, (ii) minimize the cost of grid power, such as by maximizing use of power generation system 10 when grid power is most expensive, (iii) maximize the use of power from power generation system 10, and/or (iv) maintain a desired level of charge by battery component 20.

When grid failure is detected, the switching elements 164 of the mode inverter 150 implements a mode switch that causes the power distribution subsystem 90 to operate in the off-grid mode. In the off-grid mode, the power distribution subsystem 90 may generate an output for the load devices 72, 74, 76 and/or the battery component 20. As an addition or alternative, the power distribution subsystem 90 can generate the power grid output 92 for grid load devices 166 that are serviced by the power grid 30 at a dwelling or premise of the energy system 100. Still further, as described with other examples, the power distribution subsystem 90 can generate the power grid output 92 for distribution on the power grid 30, to provide or contribute to a community power signal.

When the power grid is returned, the switching elements 164 of the mode inverter 150 implements another mode switch that causes the power distribution subsystem 90 to operate in the on-grid mode. In this mode, the power distribution subsystem 90 can continue to generate the grid power output 75 for the power grid 30.

Among other advantages, when grid power failure occurs, the energy system 100 is able to maintain a power supply to load devices 72, 74, 76 and load device interface 166 without interruption or degradation of the power supply. By comparison, under conventional approaches, when grid failure occurs, the load devices of a given system receive no power for a given duration, even when the system includes a charged battery or renewable energy component to supply power in the absence of the grid power.

Synchronized Grid Output Signal

According to examples, the power distribution subsystem 90 is configured to generate the power signal output 92 to be synchronized in phase, frequency and waveform with the existing power signal of the power grid. Among other advantages, by maintaining the power signal output 92 in a synchronized form with the existing power signal of the grid, the power distribution subsystem 90 is able to maintain continuity with respect to powering one or more load devices that utilize the AC power supplied from the power grid. Additionally, as described with an example of FIG. 4, the synchronized output can, in the event of grid failure, supply power to a community grid, to provide grid power to other power systems of a given community.

In examples, the mode inverter 150 includes a waveform tracker 160 and a switching element 164. The waveform tracker 160 can be implemented by combination of comparators that utilize state space vector control. In examples, the waveform tracker 160 employs an LC filter to receive and manipulate AC power signal 13. The mode inverter 150 further employs a state space vector circuit to compare the output parameters of the LC filter with a sine reference signal, which may be determined from the grid power signal. The state space vector circuit generates a pulse wave modulation (PWM) output directly from the comparator segment of the space vector circuit. This PWM output is synchronized with the reference signal (and thus the power grid signal) in amplitude, phase and other waveform aspects.

Alternatively, the waveform tracker can utilize a phase locked loop circuit or component to phase locked the power signal output 92 with an existing power signal of the grid. The waveform tracker 160 can modulate the power grid output 92 so that it tracks the grid power signal. The power signal output 92 can be tightly tracked to the existing power signal of the power grid 30, such that, for example, substantially no phase loss exists between the two power signals. In this way, when the grid power signal drops off, the waveform tracker 160 can instantly detect the change and trigger the switching element 164. For example, the waveform tracker 160 can detect the change within 1.0 milliseconds. The switching element 164 can switch the power grid output 92 (or portion thereof) from being delivered to power grid 30 to being delivered to one or more grid load devices or interfaces (collectively represented by grid load interface 166).

High Voltage Throughput

In some embodiments, the power distribution subsystem 90 is configured to implement a high voltage throughput, such that there is minimal step-down voltage between the input and output of the power distribution subsystem 90. In this way, the output of the power distribution subsystem 90 is high voltage, and the power distribution subsystem 90 can enable at least one high voltage interface 95 (e.g., electric vehicle port) without use of voltage step-up components. In an example, the power distribution subsystem 90 can include components that receive DC power signal 11 as a high voltage input. The control computing system 100 can employ high voltage bus lines 99 to carry the high voltage input to one or more outputs, without use of step-down components. Additionally, the components employed by the power distribution subsystem 90, such as for implementing the converter 148, control mechanism 152 and mode inverter 150, can be selected for tolerance and operability under high voltage conditions, at least to enable one high voltage interface 95. For example, the power generation system 10 can generate the DC power signal 11 to have a voltage in range of 200-800 volts, such as in range of 400-500 volts. The power distribution subsystem 90 can receive, regulate and condition the high voltage input so that the output provided through the high voltage interface 95 is about 400 volts, enabling, for example, high-speed vehicle charging through the high voltage interface 95.

Grid Failure Policy Implementation and Outlet Plug Devices

According to examples, the energy system 100 implements a set of policies for regulating use of power during certain events or conditions, such as grid failure events. The policies can be implemented using any of multiple mechanisms described with various embodiments. In some examples, the control computing subsystem 110 can directly or indirectly control the power distribution subsystem 90 to implement power management operations that control the power output to and/or power consumption of specific load devices. As an addition or variation, the load devices 72, 74, 76 (including high voltage interface 95) can implement PCPL 125 to regulate the respective device's power consumption during conditions such as high-usage events and/or grid power failure. In examples, the policies can implement prioritization schemas for the particular condition or event. For example, in the event of grid failure, the implemented policies can rank load devices that are to receive power from power generation system 10 and/or battery component 20. In one implementation, the prioritizations schema can specify, for example, (i) which devices are to receive power, (ii) the duration, condition and/or amount under which power is to be received, and/or (iii) the source of the power (e.g., via power generation system 10 or battery component 20).

In some embodiments, the policies for a particular energy system 100 can be implemented using connected outlet plug devices 98. The outlet plug devices 98 can correspond to outlet devices that implement logic (e.g., smart outlets). For example, the outlet plug devices 98 can outlet plug into a wall outlet, and include processing and communication resources to receive and implement programming and logic. In some examples, the outlet plug devices 98 can operate as edge devices 114 and/or logical components of compute control subsystem 110.

In examples, the outlet plug devices 98 can implement grid failure policies by (i) selectively shutting off, and/or (ii) shutting off specific power lines to target devices. In this way, low or lesser prioritized load devices for the grid failure condition can be shut-off, while high or higher prioritized load devices remain powered. The outlet plug devices 98 can receive and execute PCPL 125 to implement the prioritization scheme.

Methodology

Figure 2:
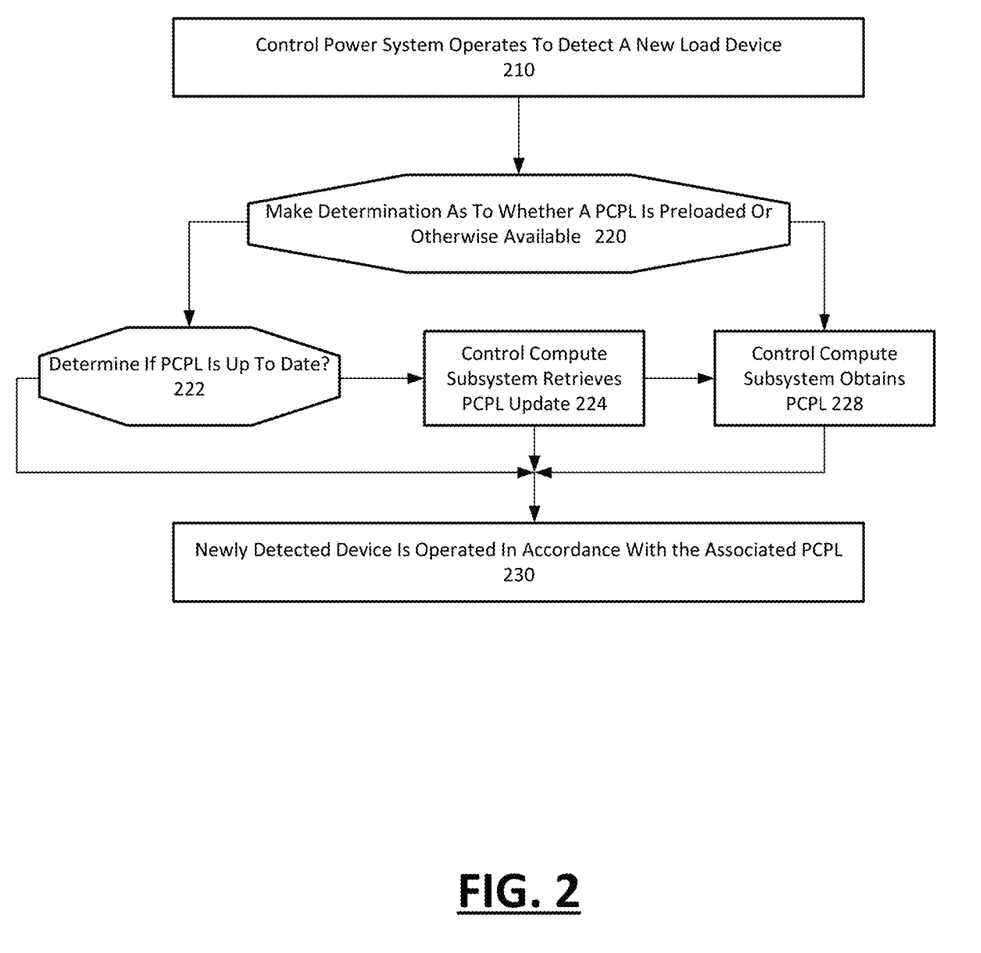
FIG. 2 illustrates an example method for implementing a power consumption logic, according to one or more embodiments.
Figure 3:
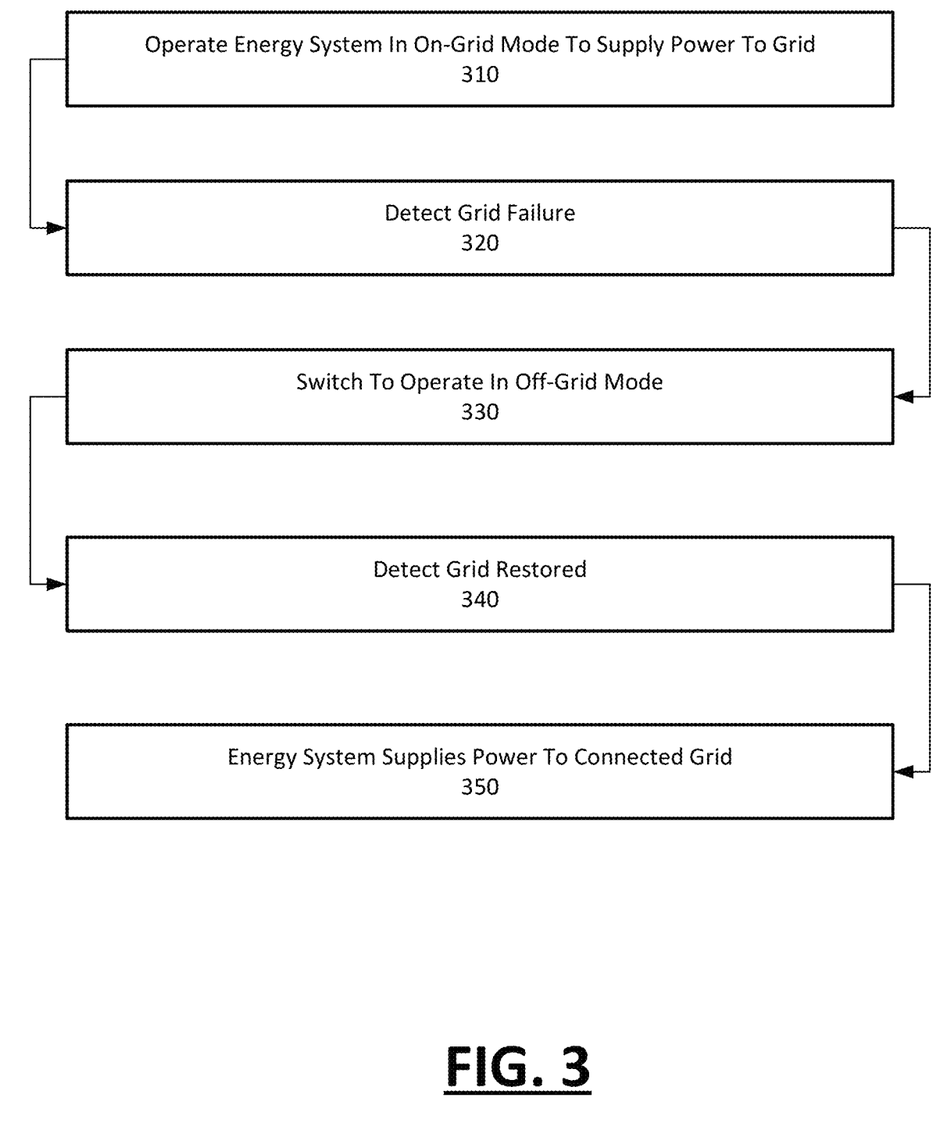
FIG. 3 illustrates a method for operating a power system for grid failure, according to one or more embodiments.

FIG. 2 illustrates an example method for implementing a power consumption logic, according to one or more embodiments. FIG. 3 illustrates a method for operating a power system for grid failure, according to one or more embodiments. An example method such as described with examples of FIG. 2 and FIG. 3 can be implemented using components such as shown and described with an example of FIG. 1. Accordingly, reference is made to elements of FIG. 1 purpose of illustrating suitable elements or components for implementing a step or sub-step being described.

With reference to an example of FIG. 2, the control computing subsystem 110 operates to detect a new load device that is connected to the power distribution subsystem 90 (210). The load device can be detected automatically as a result of the load device drawing power from the power distribution subsystem 90 and/or by the control computing subsystem 110 obtaining information about the load device 72, 74, 76. In some examples, the energy system 100 implements or resides on a local network (e.g., WiFi), and the connection with the new load device results in the device transmitting information about itself to the control computing subsystem 110. The device information can include a device identifier, a device type (e.g., light-emitting device, smart outlet plug, etc.) and/or other characteristics about the device (e.g., a characteristic about the functioning of the device). In some examples, the control computing subsystem 110 can make an additional determination to authenticate the newly connected load device.

The control computing subsystem 110 makes a determination as to whether a power consumption logic (PCPL) is preloaded or otherwise available to the control computing subsystem 110 based on the device information (220). In some examples, the control computing subsystem 110 includes a memory that stores a library of PCPL for a multitude of devices, where each PCPL is associated with a particular device, device type or other characteristic of a device that can be connected to the power distribution subsystem 90.

If the control computing subsystem 110 determines in (220) that a PCPL exists for the newly connected load device, then the newly connected load device is operated in accordance with the associated PCPL (230). The newly connected load device can receive and utilize the power output 75 from the power distribution subsystem 90. In some variations, the control computing subsystem 110 can make an additional determination as to whether the preloaded or available PCPL is up to date (222). If the preloaded or available PCPL is not up to date, the control computing subsystem 110 can communicate, via the network interface 120 with the application server 62 to retrieve the updated PCPL (224), and the control computing subsystem 110 can use the updated PCPL 125 in signaling the power distribution subsystem 90 to operate the newly connected device.

Likewise, if the control computing subsystem 110 determines in (220) that no PCPL exists for the newly connected load device, then, the control computing subsystem 110 obtains a PCPL for the newly connected load device (228). For example, the control computing subsystem 110 can communicate via the network communication interface 120 to device configuration server 162 in order to obtain a suitable PCPL for the newly connected load device. The control computing subsystem 110 then signals the power distribution subsystem 90 to operate newly connected load device in accordance with the retrieved PCPL 125.

With further reference to FIG. 3, the energy system 100 is operated in on-grid mode to supply power to a connected power grid (310). The energy system 100 can further operate to detect grid failure (320). For example, the control computing subsystem 110 can include grid sensing elements 144 that monitor the voltage and power levels of a connected power grid 30 to detect a voltage/power drop that exceeds a given threshold in magnitude and/or duration. As an addition or variation, the power distribution subsystem 90 can include a waveform tracker 160 that tracks the waveform on the power grid to detect when the power level drops off.

In response to detecting the grid failure, the energy system 100 may switch to operate in the off-grid mode. In the off-grid mode, the power distribution subsystem 90 is optimized to deliver power from the power generation system 10 to connected load devices. The energy system 100 can also generate a power output signal that matches the waveform of the grid signal before the failure, in order to supply power to grid load devices that are connected to or included with the energy system.

In examples, the energy system 100 can detect when the power grid 30 is restored (340). For example, grid sensing elements 144 can detect the presence of the power grid signal. As an alternative or addition, the waveform tracker 160 can detect restoration of the grid.

Once the grid is restored, the energy system 100 can switch back to on-grid mode, where the energy system 100 supplies power to the connected power grid (350). As described with an example of FIG. 4, the energy system 100 can supply a power output signal to the grid when grid failure exists, in order to provide power for a community grid.

Community Grid

Figure 4:
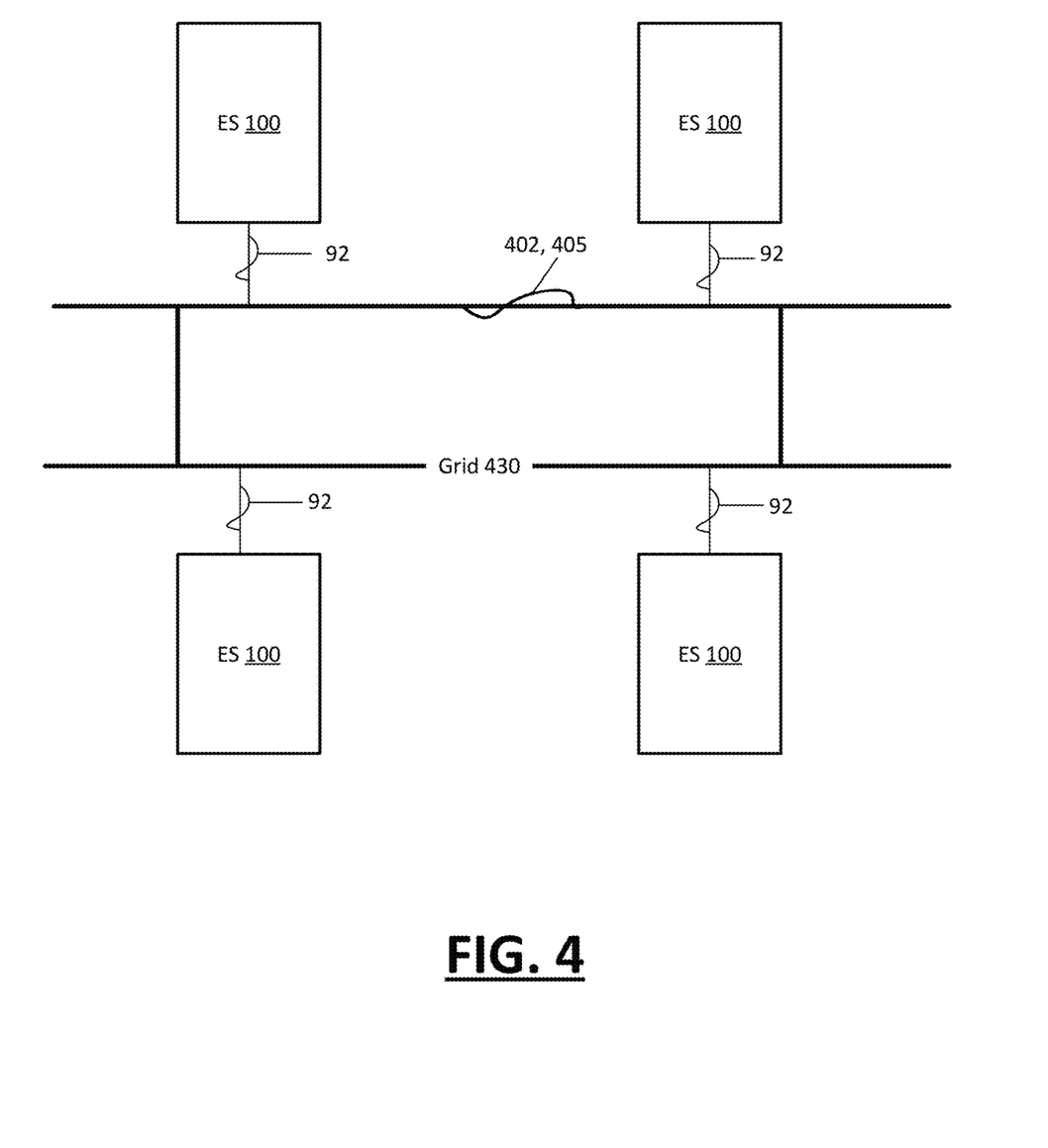
FIG. 4 illustrates an energy system for implementing a community grid, according to one or more embodiments.

FIG. 4 illustrates a given energy system to implement a community grid in combination with other energy systems, according to one or more examples. For simplicity, each energy system 100 shown in FIG. 4 is assumed to be substantially the same and configuration, components and configuration. Accordingly, the description provided for system 100 in context of an example of FIG. 4 can be assumed to be equally applicable to other systems that are connected to the community 410.

The energy system 100 operates to generate a power grid output 92 that is synchronized in phase, frequency and waveform characteristics with a power grid signal 402 of grid 430. As described with prior example, power distribution subsystem 90 includes waveform tracker 160, which operates to track the waveform of the grid power signal 402. The waveform tracker 160 modulates the power grid output 92 in phase, frequency and waveform, so that the power grid output 92 of power distribution system 90 matches the phase, frequency and waveform characteristics of grid power signal 402. In this way, the power distribution subsystem 90 generates the power grid output 92 to be synchronized with the grid power signal 402.

In the event the power grid 430 fails, the grid sensing sensors 144 and/or waveform tracker 160 operate to detect the failure. The power distribution subsystem 90 continue to generate at least a portion of the power grid output 92 to match the phase, frequency and waveform of the grid power signal 402 prior to the occurrence of the grid failure. In response to detecting the power grid failure, the power distribution subsystem 90 utilizes the switching element 164 to switch at least a portion of the power grid output 92 to locally replace the failed power grid signal 402. Additionally, one or more of the energy systems 100 can also supply a portion of the power grid output 92 to the grid 430. In particular, examples provide for the power grid output 92 to be provided to the grid 430 (now failed) with the same phase, frequency and waveform characteristics as the grid power signal 402 just prior to the failure.

One or more of the other energy systems 100 can make similar contributions of power output signals 402 that match the waveform of the grid a signal before the failure. In this way the power grid 430 continues to carry a community power signal 405 comprised of contributions by one or more energy systems 100. As the contributions from each energy system 100 is synchronized, the resulting community power signal 405 is generated more efficiently, without, for example, a need to step-up or step-down the power grid output 92 from the respective energy systems 100. Additionally, inefficiencies resulting from the respective contributions from different energy systems 100 being out-of-phase or otherwise interfering with one another is avoided. As a result, the community power signal 405 can be established on the power grid 430 instantaneously (e.g., within 1 cycle or half-cycle of power grid signal 402), following a power grid failure.

According to examples, when grid failure occurs, each of the energy system 100 can implement a grid failure PCPL 125 for enabling the energy system 100 to provide a corresponding power grid output 92 onto the power grid. In combination, the power output signals 92 form a community power grid that can provide power to other dwellings, businesses etc. while grid failure is present. Among other advantages, an energy system 100 as described with examples enables dwellings/homes to synchronize their power grid output 92 to match that of the power grid signal 402, such that when the power grid 430 fails, the energy system 100 instantaneously (e.g., less than once cycle of grid power signal 402) provide power grid output 92 to (i) operate their own grid-run load devices and assets, and/or (ii) contribute to a community power signal 405 that has the same waveform and frequency characteristics as the power grid signal 402.

Additionally, in examples, each energy system 100 can implement policies that regulate how power is (i) generated for the power grid 430 and/or (ii) drawn from the power grid 430. For example, each energy system 100 can implement policies for various conditions, including grid failure conditions. During grid failure, the policies can designate, for example, (i) the amount of power that is to be provided by the power grid output 92 for the community signal 405, (ii) an internal power delivery schema for providing power to load devices and grid load interface(s) 166 (or devices), (iii) designations of load devices which are to receive no power, and/or (iv) priority schema that identifies devices that are to receive power during grid failure (either from the power grid output 92 of the particular energy system, or from the community grid power signal 405). The priority schema can establish priority amongst load devices, where the priority rankings identify an order or priority as to which devices are powered given an available amount of power to the energy system 100.

According to some examples, each energy system 100 can implement one or more of the grid failure policies by downloading corresponding PCPLs 125 for the respective load devices 72, 74, 76. Thus, for example, the control computing subsystem 110 can cause one or more load devices 72, 74, 76 to implement a corresponding PCPL 125 that implements a priority schema amongst the load devices in the event of a power grid failure.

In examples, the energy generation system 10 and/or battery components 20 of one or more of the respective energy systems 100 are implemented as community resources. When grid failure occurs, each energy system 100 can perform load management. Additionally, power generation and distribution can be implemented in part through community resources (e.g., community solar panels, shared energy storage, etc.).

During grid failure, one or multiple energy systems 100 can be delegated control to manage energy distribution of the community resources. The distribution of energy from community resources can be done based on pre-defined policies which may exist between the community members, the utility company, and/or other entities which have a role in providing energy to the community. Accordingly, individual energy systems 100 can operate to implement power sharing policies with respect to distribution of stored or generated energy that is designated as a community resource when power failures occur.

Computer Hardware

FIG. 5 illustrates a computer system on which one or more embodiments can be implemented. A computer system 500 can be implemented on, for example, an end user computer (e.g., desktop computer, laptop, mobile device, edge computing device, home server), or combination of computer devices. The computer system 500 may be implemented as part of the of energy system 100, such as to implement the control computing subsystem 110, as described with examples of FIG. 1. Likewise, the network computer system 500 can implement a method such as described with examples of FIG. 2 and FIG. 3.

In one implementation, the computer system 500 includes processing resources 510, memory resources 520 (e.g., read-only memory (ROM) or random-access memory (RAM)), and a communication interface 550. The computer system 500 includes at least one processor 510 for processing information stored in the memory 520, such as provided by a random-access memory (RAM) or other dynamic storage device, for storing information and instructions which are executable by the processor 510. The memory 520 can also be used to store temporary variables or other intermediate information during execution of instructions to be executed by the processor 510. The computer system 500 may also include the memory resources 520 or other static storage device for storing static information and instructions for the processor 510.

The communication interface 550 enables the computer system 500 to communicate with one or more networks (e.g., cellular network) through use of the network link 580 (wireless or a wire). Using the network link 580, the computer system 500 can communicate with one or more servers, cloud computing resources, and/or other computer systems. The executable instructions stored in the memory 520 can include instructions 542, to implement a computer system such as described with examples of FIG. 1. The executable instructions stored in the memory 520 may also implement a method, such as described with one or more examples of FIG. 2 and FIG. 3.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus,

What is claimed is:

1. An energy system comprising:
   one or more converters to receive a power input from energy generation systems, and to convert the power input into an AC power signal;
   a waveform tracker that substantially synchronizes the AC power signal to a power signal of a power grid;
   wherein the energy system is operable in each of an on-grid mode and an off-grid mode, wherein in the on-grid mode, the energy system provides the synchronized AC power signal to the power grid;
   a switching element that is triggerable by a grid failure condition of the power grid to switch the energy system between the on-grid mode and the off-grid mode;
   wherein in the off-grid mode and responsive to the grid failure condition, the energy system delivers at least a portion of the AC power signal to the power grid and to one or more grid loads that operate off of the power grid.

2. The energy system of claim 1, wherein the switching element is triggerable by the waveform tracker to detect the grid failure condition.

3. The energy system of claim 2, wherein the waveform tracker includes one or more comparators that implement a state space vector control.

4. The energy system of claim 2, wherein the switching element is triggerable by the grid failure condition to switch the energy system from the on-grid mode to the off-grid mode within a sub-cycle of the power signal of the power grid.

5. The energy system of claim 1, wherein the one or more grid loads include a device that is connected to the energy system via a grid load interface, separate from the power grid.

6. The energy system of claim 1, wherein the energy system includes one or more internal power busses that are capable of receiving and supplying the power input at a voltage that exceeds 100V without a voltage step-up.

7. The energy system of claim 1, further comprising:
   a control computing subsystem that is operable to identify each of multiple load devices that are connected to the energy system, the control computing subsystem implementing one or more operations to retrieve and install power control profile logic on each of the multiple load devices, wherein the power control profile logic that is installed on each load device is specific to at least one of a load device, a type of load device, and/or an application use of the load device.

8. The energy system of claim 7, wherein the control computing subsystem implements a prioritization scheme amongst the multiple load devices as a response to the power grid switching to the off-grid mode.

9. The energy system of claim 8, wherein the control computing subsystem implements the prioritization scheme by causing each of the multiple load devices to install a corresponding power control profile logic that controls an operational aspect of the load device when the energy system is in the off-grid mode.

10. The energy system of claim 8, further comprising:
    a set of outlet plugs that are controllable by the control computing subsystem.

11. The energy system of claim 10, wherein each outlet plug of the set of outlet plugs is controllable to implement the prioritization scheme for one or more load devices that are connected to that outlet plug.

12. The energy system of claim 10, further comprising:
    an edge computing device that interconnects one or more load devices of the energy system to one or more external sources.

* * * * *